Aug. 16, 1966   J. W. FULTON, JR., ET AL   3,266,462
AUTOMATIC FEEDER SYSTEM

Filed Feb. 13, 1964   3 Sheets-Sheet 1

INVENTORS
JOSEPH W. FULTON, JR.
FREEDA R. GREENAN
BY
Dick & Zarley
ATTORNEYS

Aug. 16, 1966   J. W. FULTON, JR., ETAL   3,266,462
AUTOMATIC FEEDER SYSTEM

Filed Feb. 13, 1964                                3 Sheets-Sheet 2

INVENTORS
JOSEPH W. FULTON, JR.
FREEDA R. GREENAN
BY
Dick + Zarley
ATTORNEYS

Aug. 16, 1966       J. W. FULTON, JR., ET AL       3,266,462
AUTOMATIC FEEDER SYSTEM
Filed Feb. 13, 1964                                3 Sheets-Sheet 3

INVENTORS
JOSEPH W. FULTON, JR.
FREEDA R. GREENAN
BY
Dick & Zarley
ATTORNEYS

United States Patent Office

3,266,462
Patented August 16, 1966

3,266,462
AUTOMATIC FEEDER SYSTEM
Joseph W. Fulton, Jr., 1824 Southern Ave., Shreveport, La., and Freeda R. Greenan, Hope, Ark.; said Greenan assignor to said Fulton
Filed Feb. 13, 1964, Ser. No. 344,617
10 Claims. (Cl. 119—51.11)

This invention relates to an automatic feeder system and in particular to the means for moving a trough between several feeding stations and a feed hopper.

Therefore it is an object of this invention to provide a feeding system which has a trough which upon moving a predetermined distance away from the feeding hopper and after a predetermined time will automatically return to the feeding hopper for refilling.

It is a further object of this invention to provide an automatic feeding system wherein feed is dispensed into a moving trough as it moves between feeding stations on opposite sides thereof.

It is still a further object of this invention to provide an automatic feeding system including a movable feed trough wherein a rotating wheel frictionally engages the side of the trough to effect movement.

It is another object of this invention to provide an automatic feeding system including a movable trough wherein a driven pulley is appropriately coupled by cables to the trough for movement thereof.

It is still another object of this invention to provide an automatic feeding system having a partition wall with an opening therein covered by yieldable material through which a movable trough moves.

It is still a further object of this invention to provide an automatic feeding system having a feeding hopper which is regulated in its dispensing of feed into a trough by the damming up of the feed in the trough.

It is still a further object of this invention to provide an automatic feeding system having a means for automatically reversing the direction of rotation of a prime motor upon the feeding trough moving a predetermined distance.

A further object of this invention is to provide an automatic feeder system which is simple in design, economical to manufacture and refined in appearance.

This invention consists in the construction, arrangements, and combination, of the various parts of the device, whereby the objects contemplated are attained as hereinafter more fully set forth, specifically pointed out in the claims, and illustrated in the accompanying drawings, in which:

FIG. 1 is a fragmentary perspective view of the trough and its wedge-shaped end as it is about to pass through an opening covered by yieldable material in a partition wall.

Figure 1:
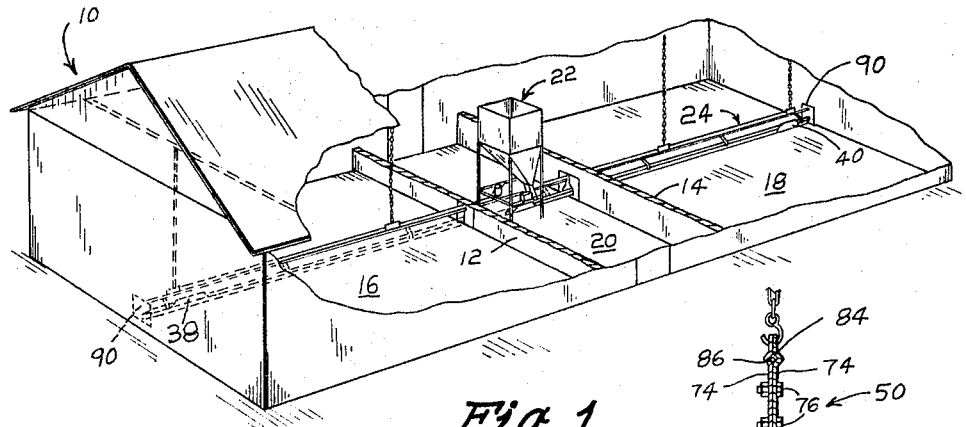
FIG. 1 is a fragmentary perspective view of a building designed for feeding chickens having a pair of feeding stations separated by an area for a feeding hopper. The movable trough is shown in solid lines extending the length of one of the feeding stations and by dash lines at another of the stations to which it moves during the course of the operating cycle.

The automatic feeding system of this invention is illustrated in FIG. 1 inside of a chicken feeding house 10 which is divided by partition walls 12 and 14 into areas 16 and 18 which serve as feeding stations and area 20 therebetween in which the hopper feed assembly 22 is located. An elongated feed trough 24 is shown in the feeding area or station 18.

Figure 2:
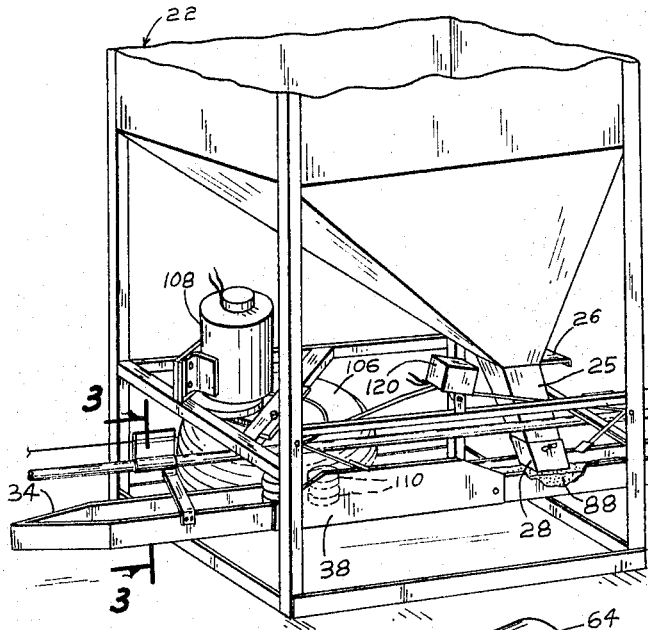
FIG. 2 is a fragmentary perspective view of the motor and wheel means for moving the trough between the feeding stations and also this view shows the trigger mechanism for reversing the rotation of the motor and wheel to cause the trough to move in opposite directions.

As shown in FIG. 2, the feed hopper assembly 22 includes a dispensing spout 25 with an adjustable closure means 26. The spout 25 has a telescoping portion 28 on the lower end which extends into the movable feed trough 24.

The trough 24 has a pair of vertically upstanding sidewalls 30 and 32 which are interconnected at opposite ends of the trough by wedge-shaped portions 34 and 36 (FIGS. 9 and 10), which have inwardly tapering sidewalls which meet along a vertical line to give the movable trough 24 the appearance of a canoe or the like.

Figure 11:
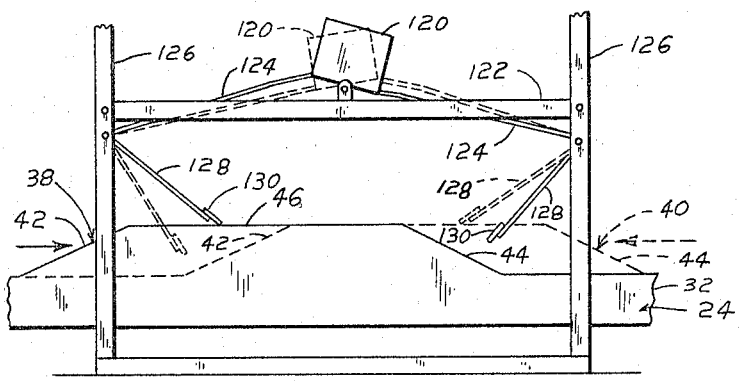
FIG. 11 is a side elevational view of the triggering means for reversing the rotation of the motor or pulley for moving the trough in opposite directions.

A pair of cam-type plates 38 and 40 are secured to the outer face of the trough sidewall 32 adjacent the end portions 34 and 36 respectively. These plates 38 and 40 have upper uniformly inwardly tapering edges 42 and 44 which extend from the upper edge of the trough sidewall 32 and terminate in a horizontal edge portion 46 (FIG. 11).

Figure 3:
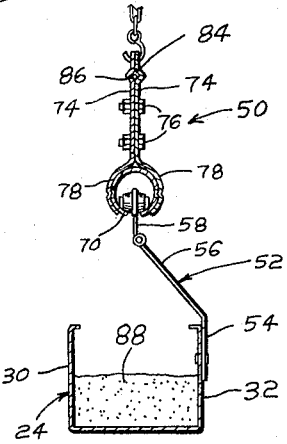
FIG. 3 is an elevational cross-sectional view taken along line 3—3 in FIG. 2 showing in particular the construction of the hopper and its support means.
Figure 4:
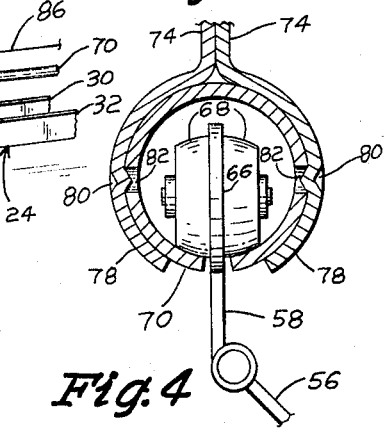
FIG. 4 is a cross-sectional elevational view similar to that of FIG. 3 but showing only the trough hanger assembly with the carriage rollers engaging the inside wall of a support tube member.
Figure 5:
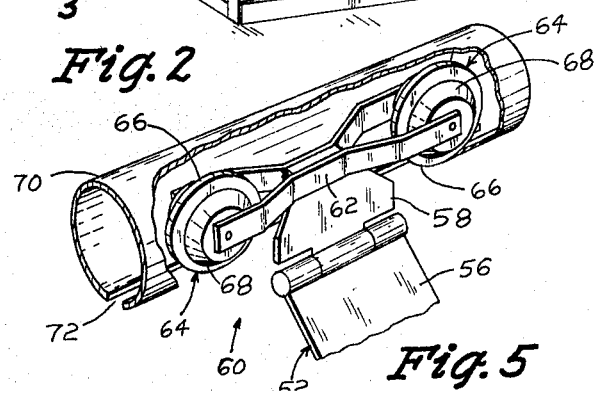
FIG. 5 is a side elevation perspective view of the movable roller carriage in the support tube member.

As is best shown in FIGS. 2 and 3, the trough 24 is movable along a hanger support assembly 50. Included in this hanger assembly 50 are a plurality of members 52 which include a first portion 54 secured to the sidewall 32 of the trough 24 and which terminates at the upper edge of the sidewall 32 in an inwardly and upwardly extending portion 56 which is pivotally connected to a plate element 58 in a plane extending vertically through the longitudinal center of the trough 24. Each of the plates 58 are rigidly secured to a carriage 60 (FIG. 5) at the center portion of a frame 62 which has a pair of roller members 64 at each of its ends. The roller members 64 each comprise a circular plate element 66 having a larger outer diameter than the larger diameter of two outwardly extending truncated cone portions 68 disposed on opposite sides of the circular plate 66. The carriage 60 through its rollers 64 is received in a support rail tube 70 which extends the full length of the building 10 and has a longitudinal slot 72 formed along its lower side in which the circular plate portion 66 of the roller 64 is received. The edges of the slot 72 serve as guides for the rollers 64. The outer edges of the portions 68 are rounded as well as tapered and thereby matingly engage the inner cylindrical surface of the tube 70 (FIG. 4).

As shown in FIG. 3, a pair of identical plates 74 are clamped together by bolts 76 and have semicircular lower portions 78 for clamping engagement around the tube 70. To provide additional assurance that the plate clamp element 74 will not move relative to the tube 70, dimples 80 are formed in the walls of the semicircular portion 78 which extend into holes 82 in the sidewalls of the tube 70. Adjacent the top edge of each of the clamp plates 74 a V-shaped recess 84 is formed whereby the tube plates 74 completely embrace a wire or cable 86 which extends the full length of the tube 70. The cable or wire 86 will prevent chickens from roosting on the support tube 70 since it extends directly above the tube 70.

As seen in each of FIGS. 2 and 3, the movable trough 24 is adapted to hold a quantity of feed 88 which is dispensed from the hopper spout 25. The adjustable spout end portion 28 is adapted to be varied in its height relative to the bottom of the trough 24 such that the amount of feed 88 may be varied. Once the desired level of feed in the trough has been reached, the opening in the end of the spout portion 28 will be closed off by the feed damming up at that point as is best shown in FIG. 2.

Figure 8:
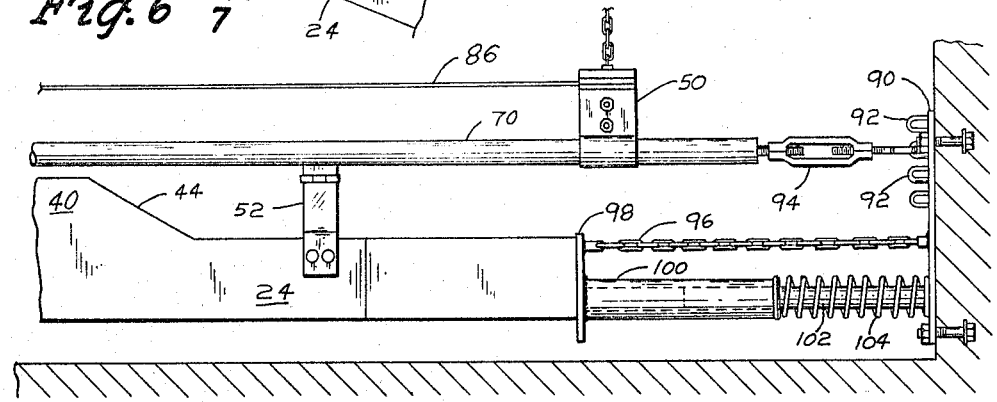
FIG. 8 is a fragmentary elevational view of the right end of the trough when the trough is in a solid line position as illustrated in FIG. 1.

At each end of the building 10, as shown in FIGS. 1 and 8, a plate 90 is bolted to the outer housing wall. Adjacent the top of the plate 90 a series of vertically aligned eyes 92 are affixed to the plate 90 and are adapted to receive one end of a toggle bolt 94 which has its other end adjustably secured to the adjacent end of the tube 70. By this arrangement, the tension in the tube 70 may be kept at the desired level at all times by adjusting the toggle bolt 94.

Below the tube 70 and toggle bolt 94 is a chain 96 having one end secured to the plate 90 and its other ends secured to another plate 98 spaced outwardly from the end wall of the building. A tube 100 is welded on the outer side of the plate 98 from the trough 24 and movably receives a shaft 102 which has a coil spring 104 positioned thereon between the outer end of the tube 100 and the plate 90. Thus it is seen that the plate 98 is urged by the spring 104 towards the trough 24 to the extent permitted by the length of the chain 96. Conversely, the trough 24 when engaging the plate 98 may move a certain distance against the resiliency of the spring 104.

Figure 9:
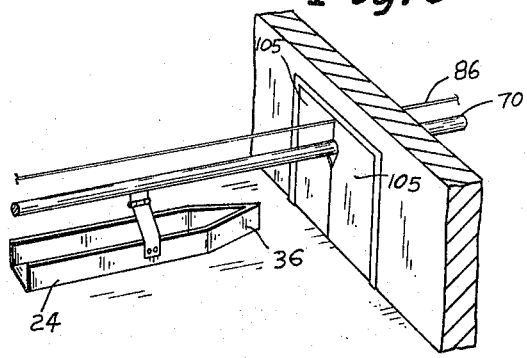
Figure 10:
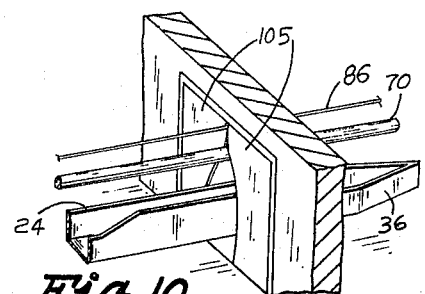
FIG. 10 is a fragmentary perspective view similar to FIG. 9 but showing the movable trough extending partially through the yieldable material covering the opening in the partition wall.

The partitions or walls 12 and 14 separating the feeding stations 16 and 18 from the hopper area 20 are substantially closed off except for a small opening at their base. As shown in FIGS. 1, 9 and 10, this opening is closed by a pair of resilient flexible pieces of material such as rubber or the like which are adapted to yield to the force supplied by the wedge-shaped end 36 of the trough 24 as it moves through the walls. It is noted that this material 105 embraces each side of the trough 24 and to some extent overlaps the top thereof. Small notches facing each other are formed in the inner edges of the panels of material 105 to receive the cable or wire 86 and the hanger tube 70.

Figure 6:
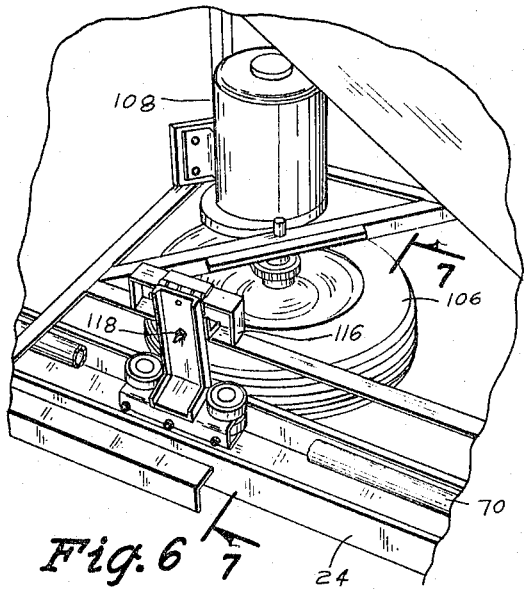
FIG. 6 is a perspective view of only the prime mover wheel in frictional engagement with the side of the movable trough and also showing a series of rollers adjustably bearing against the opposite side of the trough wall from the prime mover wheel.
Figure 7:
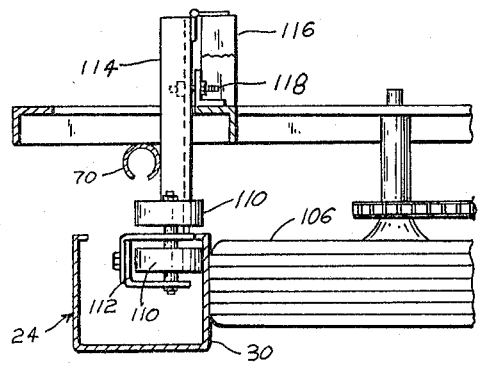
FIG. 7 is an elevational cross-sectional view along line 7—7 in FIG. 6.

As shown in FIGS. 2, 6 and 7, the trough 24 is moved longitudinally of the building by a wheel such as a tire or the like 106 which is disposed in a horizontal plane in the position for its outer peripheral surface to frictionally engage the sidewall 30 of the trough 24. Through an appropriate gear train, a motor 108 is positioned above and drives the wheel 106. To stabilize the trough 24 for maintaining the frictional contact between the sidewall 30 and the wheel 106, a plurality of rollers 110 are positioned inside the trough 24 with some of the rollers 110 bearing against the inner surface of the sidewall 30. The rollers 110 are mounted on a carriage frame 112, which is fixedly secured to one end of an arm 114, which is pivotally connected to a hopper frame portion 116. A bolt 118 is provided below the pivotal connection for selectively varying the force to be applied to the trough sidewall 30 by the rollers 110.

A switch control assembly 120 is shown in FIGS. 2 and 11 as being pivotally connected to a horizontal hopper frame portion 122 above the trough 24. Extending in opposite directions from the switch assembly housing 120 are members 124, which are pivotally connected to hopper vertical uprights 126. From this pivotal connection, trigger members 128 extend inwardly and downwardly from the adjacent members 124. Enlarged end portions 130 are formed on the lower end of the trigger members 128. As shown in FIG. 11, the cam plate 38, shown in the solid lines, engages the trigger portion 130 of the left-hand trigger 128 as the trough moves to the left, as viewed in FIGS. 2 and 11, by first riding along the tapered edge 44 to a position on top of the horizontal edge 46. Consequently, the switch assembly 120 is pivoted to the solid position in FIG. 11 and in FIG. 2. The trigger arms 128 are spaced far enough apart, a distance greater than the length of the cam plates 38 and 40, thereby permitting only one trigger arm 128 to engage a plate at a time. Specifically, the left-hand trigger arm 128 only engages the cam plate 38 at the left end of the trough 24 while the right-hand trigger arm 128 is the only arm to contact the cam plate 40 at the right end of the trough 24, the plate 38 being represented by solid lines and the plate 40 dash lines in FIG. 11. When the trough 24 moves to the left end of the building 10, the right-hand trigger arm 128 will ride against the tapered edge 42 of the cam plate 40 to a position on the top horizontal edge 46, thereby tilting the switch assembly 120 to the opposite dash lines position, as illustrated in FIG. 11.

Figure 12:
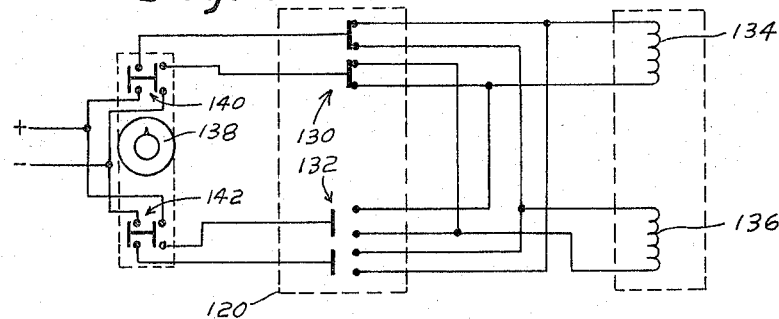
FIG. 12 is an electrical schematic of the wiring for the automatic feeding system.

The switch assembly 120 contains a pair of mercury switches 130 and 132, one of which is closed at all times, depending on the position of the switch assembly. As shown in FIGS. 11 and 12, the switch assembly is in the solid line position to the right and thus the switch 130 is closed. However, when the switch assembly is pivoted to the left to the dash line position, the mercury switch 132 is closed and the mercury switch 130 is opened. Through the circuitry illustrated in FIG. 12, each of the switches 130 and 132 are capable of reversing the polarity through the starting and running coils 134 and 136 of the motor 108. A timer 138 is connected to an electrical power supply and in turn connected to a pair of electrical breakers 140 and 142 to the mercury switches 130 and 132 respectively. At predetermined times as set by the operator, the breakers 140 and 142 are simultaneously closed, thereby energizing the motor coils 134 and 136 through either of the mercury switches 130 or 132, depending upon the position of the switch assembly 120. Thus, when the mercury switch 130 is closed the polarity of the motor coils 134 and 136 is reversed from its polarity when the switch 132 is closed and the switch 130 is opened, thereby causing the motor 108 to turn in opposite directions as the switch 120 is moved from one position to the other. In operation, the timer 138 is set to close the breakers 140 and 142 at a predetermined time, thereby starting the motor 108 turning the wheel 106 and, accordingly, moving the trough 24 from one end of the building 10 to the other end. During the trough's movement between the ends of the building, the hopper 22 will be dispensing feed to the lower edge of the outlet spout portion 28. Once the trough 24 reaches the end of the building 10, the mercury switch previously opened is closed and similarly the switch that was previously closed is opened and simultaneously the timer 138 is reset thereby opening the breakers 140 and 142 until a predetermined time has elapsed whereupon they are again closed for the operating cycle to the repeated.

Figure 13:
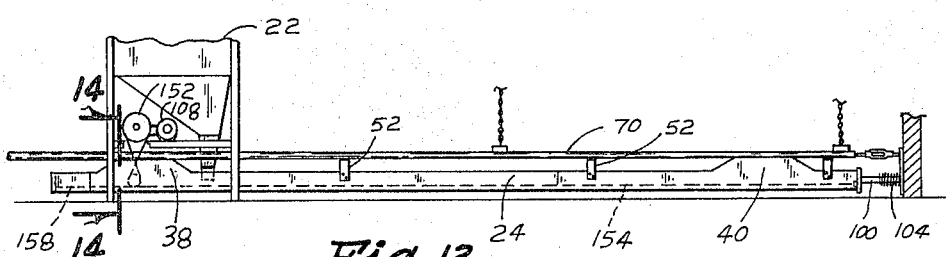
FIG. 13 is a side elevational view of the trough and an alternate means for moving the trough including a pulley and cable assembly coupled to a motor.
Figure 14:
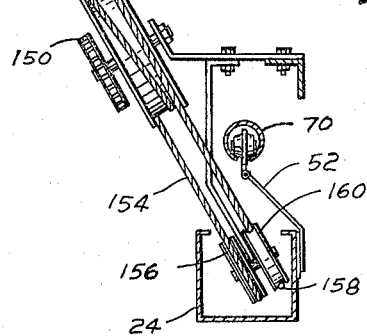
FIG. 14 is a cross-sectional view taken along line 14—14 in FIG. 13.

In FIGS. 13 and 14 an alternative power mechanism is shown which is also operated in accordance with electrical circuitry illustrated in FIG. 12 for the wheel drive embodiment of FIGS. 2, 6 and 7. Through a chain drive 150 connected to the motor 108 a drive pulley 152 is adapted to be rotated in its angular position as shown in FIG. 14. A length of cable having a first cable portion 154 is secured to the right end of the trough (FIG. 13) and extends therealong and over a pulley 156 below the drive pulley 152. The cable 154 then extends around one side of the drive pulley 152 and is secured thereto. A second cable portion 158 is secured to the left end of the trough 24 and extends therealong and around a pulley 160 mounted on the same axis as the pulley 156, and then extends upwardly and around the opposite side of the pulley 152 where it is secured. Consequently, as the pulley 152 is turned in a counter-clockwise direction, the cable 154 will be reeled in and the trough 24 will move to the left end of the building 10 while simultaneously the cable 158 will be let out or reeled out from the drive pulley 152. When the drive pulley 152 is turned in the opposite direction, or clockwise, the trough 24 will move to the right end of the building 10.

Some changes may be made in the construction and arrangement of our automatic feeder system without departing from the real spirit and purpose of our invention, and it is our intention to cover by our claims, any modified forms of structure or use of mechanical equivalents which may be reasonably included within their scope.

We claim:
1. A feeding system, comprising,
 a pair of spaced apart feeding stations,
 a hopper disposed between said feeding stations, said hopper having an outlet opening,
 an elongated feeding trough,
 an electric motor operatively coupled to said feeding trough to move said trough between said feeding stations, and said trough adapted to receive feed from said hopper outlet opening as said trough moves between said feeding stations,
 a switch assembly adapted to pivot to opposite sides of a vertical plane, said assembly having a pair of mercury switches, said switches being disposed in said assembly at an angle to each other, and one of said switches being closed when said assembly is pivoted to one side of said vertical plane and opened when pivoted to the opposite side, the other of said switches adapted to be opened when said assembly is pivoted to said one side of said vertical plane and closed when pivoted to the other side,
 a pair of trigger members operatively pivoting said switch assembly, one of said trigger members being adapted to be actuated by said trough when said trough has moved to one of said feeding stations and the other trigger member adapted to be actuated when said trough is moved to said other feeding station, and
 means associated with said switches, motor and its coupling to said trough for alternately reversing the direction of movement of said trough to cause said trough to move from one of said feed stations to the other of said feed stations, and said trough adapted to receive feed from said hopper outlet opening as it moves between said feeding stations.

2. The structure of claim 1 wherein the coupling of said motor to said trough includes,
 a wheel member rotatably mounted adjacent said trough, and the peripheral surface of said wheel adapted to frictionally contact a sidewall of said trough.

3. The structure of claim 1 wherein the coupling of said motor to said trough includes,
 a pair of wheels disposed directly opposite each other on opposite sides of one of the walls of said trough, the peripheral surface of each of said wheels adapted to frictionally contact said one sidewall, said wheels upon being rotated in one direction being adapted to move said elongated trough to said feeding station and, upon being rotated in the opposite direction, being adapted to move said trough to a point adjacent said hopper for receiving feed through said outlet opening.

4. The structure of claim 1 wherein the coupling of said motor to said trough includes,
 a wheel member rotatably mounted adjacent said trough, and the peripheral surface of said wheel adapted to frictionally contact a sidewall of said trough, and
 said outlet spout is disposed above and extends into said trough, said feed is adapted to be discharged from said hopper until it dams up against the end of said spout whereby the flow of feed into said trough is stopped until said trough is moved,
 said wheel upon being rotated in one direction being adapted to move said elongated trough to said feeding station and, upon being rotated in the opposite direction, being adapted to move said trough to a point adjacent said hopper for receiving feed through said outlet opening.

5. The structure of claim 1 and a pair of walls being disposed on opposite sides of said hopper for separating said feeding stations from said hopper, each of said walls having an opening formed therein, and means yieldably closing said opening and adapted to open upon being engaged by said trough for said trough to move to the adjacent feeding station.

6. The structure of claim 1 and a pair of walls being disposed on opposite sides of said hopper for separating said feeding stations from said hopper, each of said walls having an opening formed therein, a flexible means closing said opening and having a pair of portions with adjacent edges, said trough having end portions with sides which taper inwardly towards each other, said trough adapted to engage said adjacent edges along said inwardly tapered sides thereby separating said adjacent edges only enough to permit said trough to move through said wall opening to the adjacent feeding station.

7. The structure of claim 1 wherein the coupling of said motor to said trough includes,
 an elongated feeding trough,
 a cable portion secured at opposite ends of said trough,
 a drive pulley means,
 each of said cables extending inwardly of its respective end of said trough and in opposite directions around said drive pulley, and said cables being secured to said pulley means, and
 said pulley means being adapted to rotate in either direction and thereby wind in one cable while letting out the other cable for moving the trough between said feeding stations.

8. The structure of claim 1 wherein said outlet opening remains stationary relative to said trough to uniformly distribute feed along said trough.

9. A feeding system, comprising,
 a pair of spaced apart feeding stations,
 a hopper disposed between said feeding stations, said hopper having an outlet opening,
 an elongated feeding trough,
 a pair of cables secured at opposite ends of said trough,
 a drive pulley means,
 each of said cables extending inwardly of its respective end of said trough and in opposite directions around said drive pulley, and said cables being secured to said pulley means,
 said pulley means being adapted to rotate in either direction and thereby wind in one cable while letting out the other cable for moving the trough between said feeding stations, and said trough adapted to receive feed from said hopper outlet opening as it moves between said feeding stations,
 an electric motor for rotating said pulley means, a switch assembly adapted to pivot to opposite sides of a vertical plane, said assembly having a pair of mercury switches, said switches being disposed in said assembly at an angle to each other, and one of said switches being closed when said assembly is pivoted to one side of said vertical plane and opened when pivoted to the opposite side, the other of said switches adapted to be opened when said assembly is pivoted to said one side of said vertical plane and closed when pivoted to the other side, a pair of trigger members operatively pivoting said switch assembly, one of said trigger members being adapted to be actuated by said trough when said trough has moved to one of said feeding stations and the other trigger member adapted to be actuated when said trough is moved to said other feeding station, and said switches being in separate circuits with the windings of said motor and said power source and adapted to connect alternately opposite poles of said power source to the terminals of said windings to alternately operate the motor in opposite directions and thereby rotate said pulley means in opposite directions for moving said trough alternately from one of said feed stations to the other of said feed stations, and said trough adapted to receive feed from said hopper outlet opening as it moves between said feeding stations.

10. A feeding system, comprising,
a pair of spaced apart feeding stations,
a hopper disposed between said feeding stations, said hopper having an outlet opening,
an elongated feeding trough,
an electric motor operatively coupled to said feeding trough to move said trough between said feeding stations, and said trough adapted to receive feed from said hopper outlet opening as said trough moves between said feeding stations, a switch assembly adapted to pivot to opposite sides of a vertical plane, said assembly having a pair of mercury switches, said switches being disposed in said assembly at an angle to each other, and one of said switches being closed when said assembly is pivoted to one side of said vertical plane and opened when pivoted to the opposite side, the other of said switches adapted to be opened when said assembly is pivoted to said one side of said vertical plane and closed when pivoted to the other side, a pair of trigger members operatively pivoting said switch assembly, one of said trigger members being adapted to be actuated by said trough when said trough has moved to one of said feeding stations and the other trigger member adapted to be actuated when said trough is moved to said other feeding station, and said switches being in separate circuits with the windings of said motor and said power source and adapted to connect alternately opposite poles of said power source to the terminals of said windings to alternately reverse the direction of rotation of said motor and thereby move said trough alternately from one of said feed stations to the other of said feed stations, and said trough adapted to receive feed from said hopper outlet opening as it moves between said feeding stations.

References Cited by the Examiner
UNITED STATES PATENTS

| | | | |
|---|---|---|---|
| 2,786,448 | 3/1957 | McMaster | 119—52 |
| 2,987,038 | 6/1961 | Cole | 119—18 |

SAMUEL KOREN, *Primary Examiner.*

HUGH R. CHAMBLEE, *Examiner.*